United States Patent
Nakamoto et al.

(10) Patent No.: US 11,887,091 B2
(45) Date of Patent: Jan. 30, 2024

(54) MONEY HANDLING APPARATUS AND MONEY HANDLING SYSTEM

(71) Applicant: GLORY LTD., Himeji (JP)

(72) Inventors: Tasuku Nakamoto, Himeji (JP); Ryuji Kataoka, Himeji (JP); Kazuhiro Doi, Himeji (JP)

(73) Assignee: GLORY LTD., Himeji (JP)

( * ) Notice: Subject to any disclaimer, the term of this patent is extended or adjusted under 35 U.S.C. 154(b) by 723 days.

(21) Appl. No.: 16/801,368

(22) Filed: Feb. 26, 2020

(65) Prior Publication Data

US 2020/0273009 A1 Aug. 27, 2020

(30) Foreign Application Priority Data

Feb. 27, 2019 (JP) .................................. 2019-033622

(51) Int. Cl.
*G06Q 20/20* (2012.01)
*G07D 11/50* (2019.01)
(Continued)

(52) U.S. Cl.
CPC ............. *G06Q 20/202* (2013.01); *G07D 9/00* (2013.01); *G07D 11/009* (2013.01); *G07D 11/22* (2019.01); *G07D 11/50* (2019.01)

(58) Field of Classification Search
CPC . G07D 1/06; G07D 9/00; G07D 11/00; G07D 11/009; G07D 11/20; G07D 11/22; G07D 11/50; G06Q 20/202
See application file for complete search history.

(56) References Cited

U.S. PATENT DOCUMENTS 8,255,581 B2 * 8/2012 Wee ...................... G06F 3/0227
705/16
10,762,737 B2 * 9/2020 Wakabayashi ......... G06Q 20/18
(Continued)

FOREIGN PATENT DOCUMENTS

| EP | 3 054 428 A2 | 8/2016 |
| JP | 2003-263679 A | 9/2003 |
| JP | 2017-208020 A | 11/2017 |

OTHER PUBLICATIONS

Extended European Search Report, Application No. 20158939.7, dated Jul. 23, 2020, 9 pages.

*Primary Examiner* — Thien M Le
*Assistant Examiner* — April A Taylor
(74) *Attorney, Agent, or Firm* — Foley & Lardner LLP

(57) ABSTRACT

Provided is a money handling apparatus that can be easily introduced in a store. The money handling system includes: a money handling apparatus installed in a store and capable of executing basic functions including a checkout function; and a operation terminal connected to the money handling apparatus. When executing the checkout function, the money handling apparatus receives, through the operation terminal, an input of prices and quantities of items a customer purchases in the store, to calculate a transaction amount. The apparatus recognizes and counts money, which is deposited through an inlet for paying the transaction amount, to calculate a deposit amount of deposited money, and stores the deposited money inside the money handling apparatus. When the deposit amount exceeds the transaction amount, the money handling apparatus feeds out money corresponding to a difference therebetween, and dispenses the fed out money as change to an outlet.

10 Claims, 9 Drawing Sheets

(51) Int. Cl.
*G07D 11/22* (2019.01)
*G07D 9/00* (2006.01)
*G07D 11/00* (2019.01)

(56) References Cited

U.S. PATENT DOCUMENTS

| | | | |
|---|---|---|---|
| 2003/0178281 A1* | 9/2003 | Goto | G07F 19/202 |
| | | | 194/206 |
| 2009/0101723 A1 | 4/2009 | Uehara et al. | |
| 2015/0379495 A1 | 12/2015 | Nakagawa et al. | |

* cited by examiner

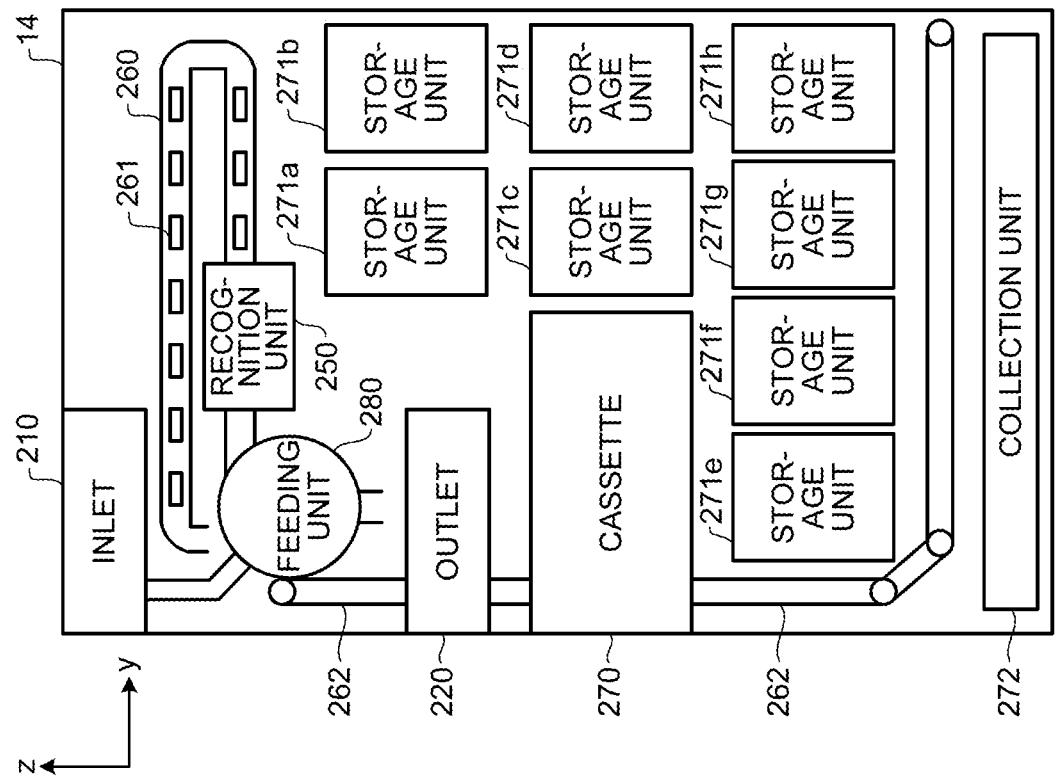
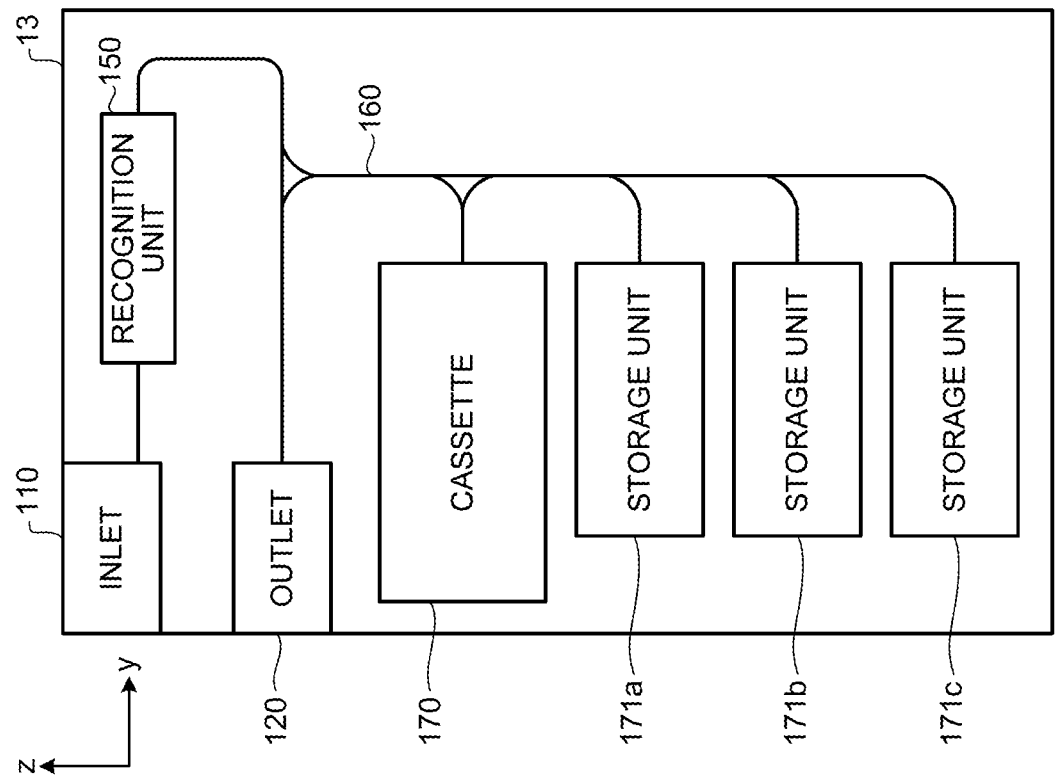

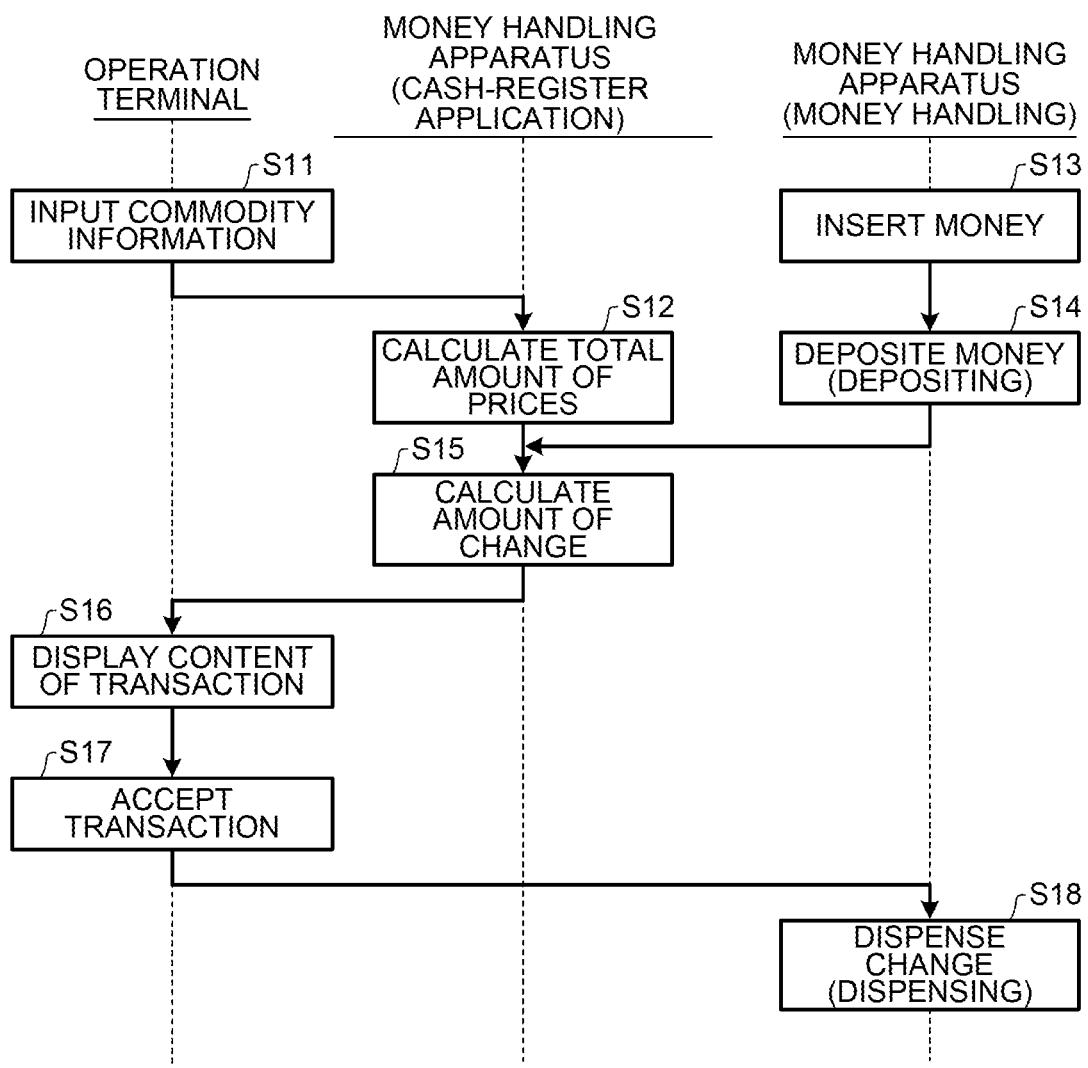

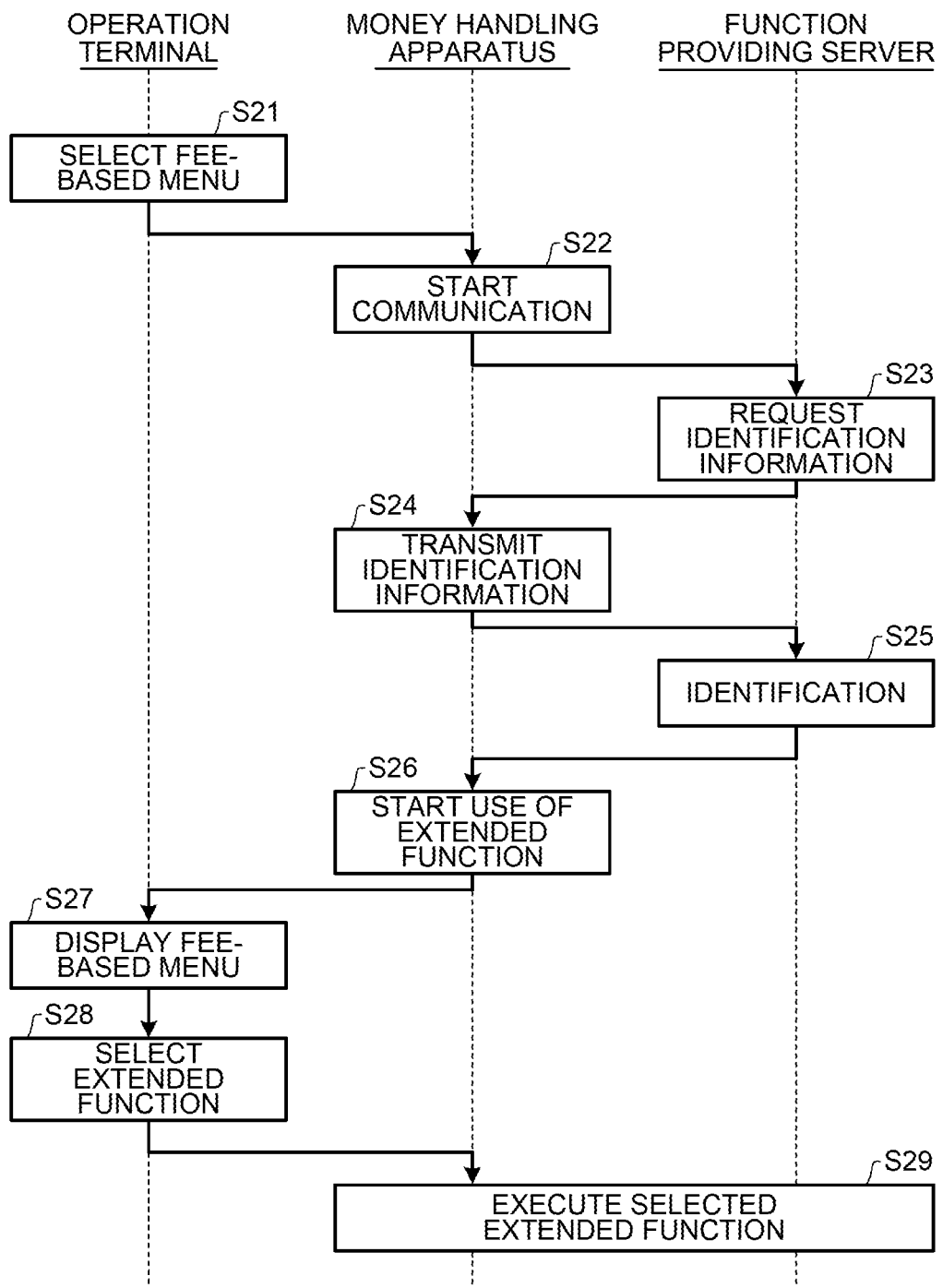

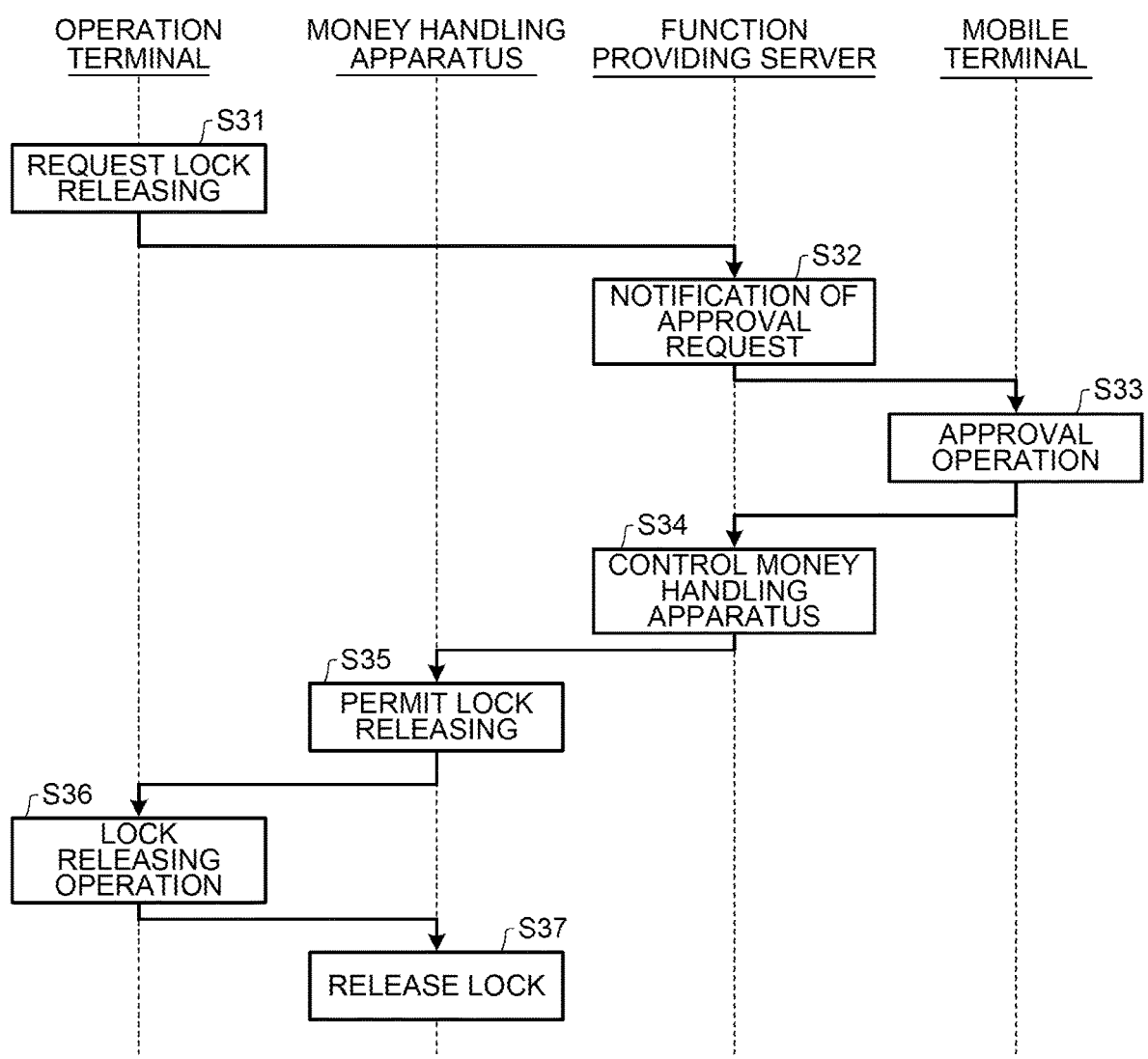

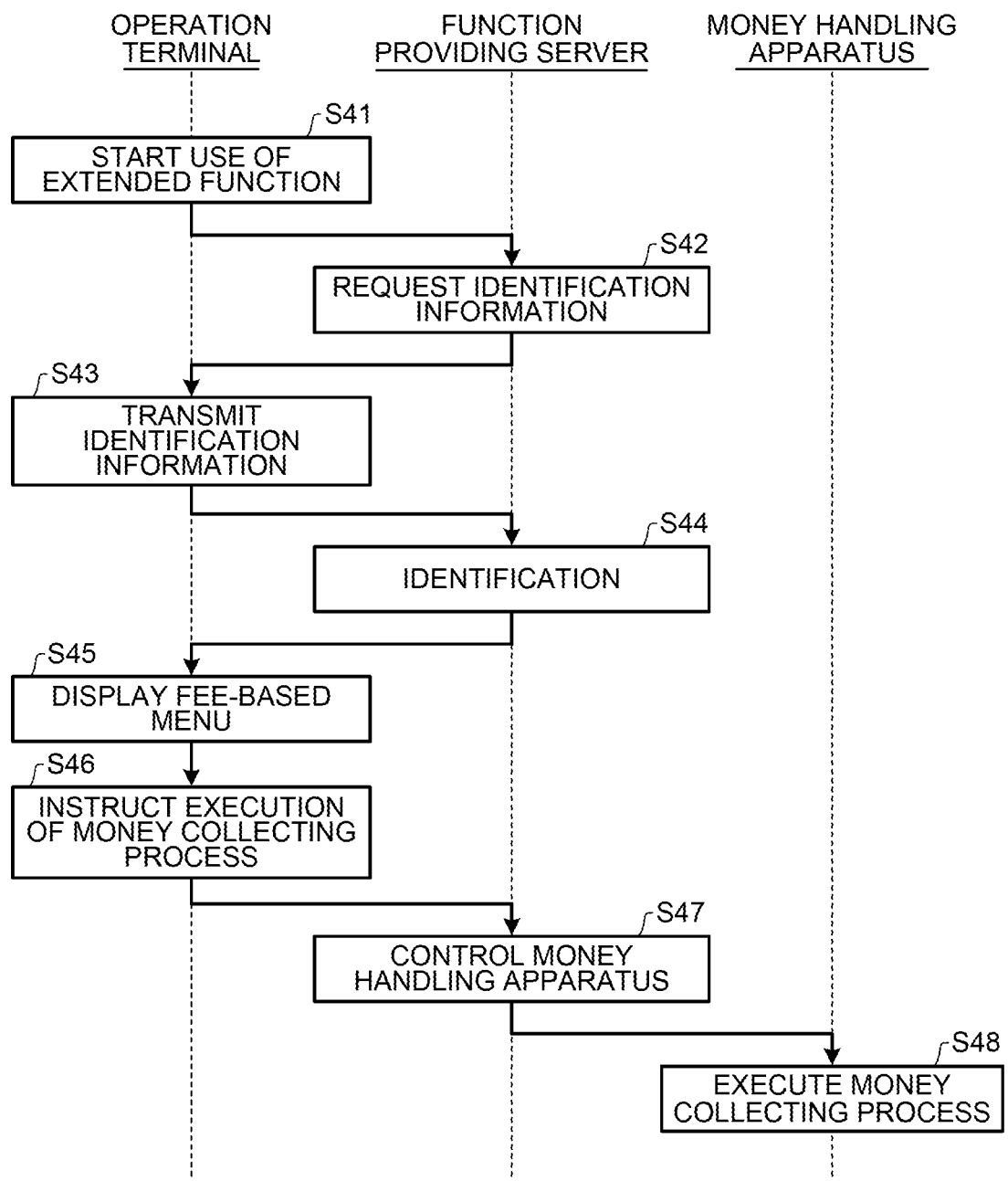

MONEY HANDLING APPARATUS AND MONEY HANDLING SYSTEM

BACKGROUND OF THE INVENTION

Field of the Invention

The present invention relates to a money handling apparatus and a money handling system.

Description of the Background Art

Conventionally, money handling apparatuses have been used for checkout at checkout counters in stores. For example, Japanese Laid-Open Patent Publication No. 2003-263679 discloses a system in which a change machine is connected to a POS register installed in a store. The change machine is a money handling apparatus capable of executing a money depositing process and a money dispensing process. The POS register is connected to a POS server in a main office via a network. The POS register calculates a total amount of prices of items a customer purchases, by using item information managed by the POS server. The POS register controls the change machine to execute the depositing process of money received from the customer. In the depositing process, the received money is recognized and counted to obtain an amount of deposited money. When the amount of deposited money exceeds the total amount of prices of items, the POS register controls the change machine to execute the dispensing process of change to be returned to the customer.

SUMMARY OF THE INVENTION

However, the conventional change machine is a money handling apparatus premised on use of a POS system, and therefore is not suitable to be introduced in small stores using no POS systems. Thus, a money handling apparatus, which can be easily introduced as a change machine in stores using no POS system, has been desired.

The present invention is made in view of the problem of the conventional art, and an object of the present invention is to provide a money handling apparatus and a money handling system that can be easily introduced regardless of the scale of a store.

In order to solve the above problem and achieve the object, a money handling system according to one aspect of the present invention includes: a money handling apparatus installed in a store and configured to execute basic functions including a checkout function; and an operation terminal connected to the money handling apparatus. When executing the checkout function, the money handling apparatus receives, through the operation terminal, an input of prices and quantities of items a customer purchases in the store, to calculate a transaction amount. The money handling apparatus recognizes and counts money, which has been deposited through an inlet for paying the transaction amount, to calculate a deposit amount of deposited money, and stores the deposited money inside the money handling apparatus. When the deposit amount exceeds the transaction amount, the money handling apparatus dispenses, to an outlet, money corresponding to a difference between the deposit amount and the transaction amount as change fed out from inside the money handling apparatus.

A money handling apparatus according to another aspect of the present invention included: an inlet from which money is deposited; a recognition unit configured to recognize and count the money deposited through the inlet; a storage unit configured to store the money recognized and counted by the recognition unit; an outlet from which money fed out from the storage unit is dispensed; a memory configured to store information on basic functions including a checkout function; and a control unit configured to execute the basic functions, based on the information stored in the memory. When executing the checkout function, the recognition unit recognizes and counts the money deposited through the inlet to calculate a deposit amount of deposited money, the storage unit stores the money recognized and counted by the recognition unit, and the control unit receives an input of prices and quantities of items a customer purchases, and calculates a transaction amount. When the amount of deposited money exceeds the transaction amount, the outlet dispenses money corresponding to a difference between the deposit amount and the transaction amount as change fed out from the storage unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3A schematically shows an internal configuration of a banknote handling unit;

FIG. 3B schematically shows an internal configuration of a coin handling unit;

FIG. 6 illustrates the flow of checkout;

FIG. 7 illustrates the flow of processing using the extended functions;

FIG. 8 illustrates the flow of processing for releasing a lock mechanism of the money handling apparatus by using a function of remote approval; and FIG. 9 illustrates the flow of processing using the extended functions by operating a mobile device.

DESCRIPTION OF THE PREFERRED EMBODIMENTS

Figure 1:
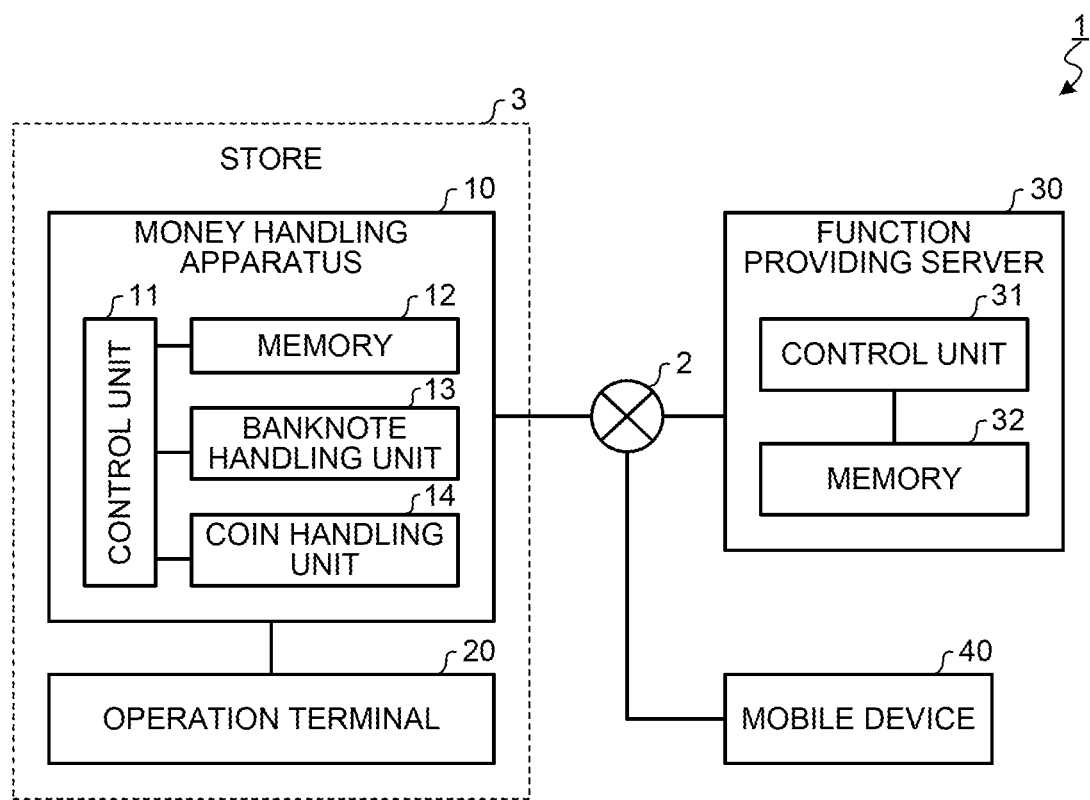
FIG. 1 is a block diagram showing a configuration of a money handling system according to an embodiment.

Hereinafter, a money handling apparatus and a money handling system according to the present invention will be described with reference to the accompanying drawings. FIG. 1 is a block diagram showing the configuration of a money handling system 1 according to an embodiment. The money handling system 1 includes a money handling apparatus 10, an operation terminal 20, a function providing server 30, and a mobile device 40.

The money handling apparatus 10 and the operation terminal 20 are installed in a store 3. The function providing server 30 is installed outside the store 3. The function providing server 30 is installed in, for example, a management company managing the money handling apparatus 10. The place where the mobile device 40 is used is not particularly limited, and may be either inside or outside the store 3.

The money handling apparatus 10 is communicably connected to the operation terminal 20. The money handling apparatus 10, the function providing server 30, and the mobile device 40 are communicably connected to each other via a network 2. The network 2 includes the Internet.

The money handling apparatus 10 includes a control unit 11, a memory 12, a banknote handling unit 13, and a coin handling unit 14. The banknote handling unit 13 executes a depositing process and a dispensing process of banknotes. The coin handling unit 14 executes a depositing process and a dispensing process of coins. Hereinafter, "banknotes" and "coins" may be referred to as "money" when banknotes and/or coins are mentioned.

The memory 12 is a nonvolatile storage device. Various kinds of information required for implementing the function and operation of the money handling apparatus 10 are stored in the memory 12. Based on at least one of information inputted from the operation terminal 20 and information inputted through the network 2, the control unit 11 controls the respective units while using the various kinds of information stored in the memory 12. Thus, the function and operation of the money handling apparatus 10 according to the present embodiment are realized.

The operation terminal 20 is a computer device having an operation unit and a display unit. For example, a tablet computer having a touch panel type liquid crystal display is used as the operation terminal 20. The operation terminal 20 functions as an operation unit for inputting various kinds of information to the money handling apparatus 10. The operation terminal 20 functions as a display unit for displaying various kinds of information outputted from the money handling apparatus 10.

The function providing server 30 is a computer device having an operation unit and a display unit. The function providing server 30 includes a control unit 31 and a memory 32. The memory 32 is a nonvolatile storage device. Various kinds of information required for implementing the function and operation of the function providing server 30 are stored in the memory 32. Based on at least one of information inputted from the operation unit and information inputted through the network 2, the control unit 31 controls the respective units while using the various kinds of information stored in the memory 32. Thus, the function and operation of the function providing server 30 according to the present embodiment are realized.

The mobile device 40 is a portable communication terminal having an operation unit and a display unit. For example, a smartphone or a tablet computer including a touch panel type liquid crystal display is used as the mobile device 40. The mobile device 40 functions as an operation unit for inputting various kinds of information to the function providing server 30. The mobile device 40 functions as a display unit for displaying various kinds of information outputted from the function providing server 30.

Figure 2:
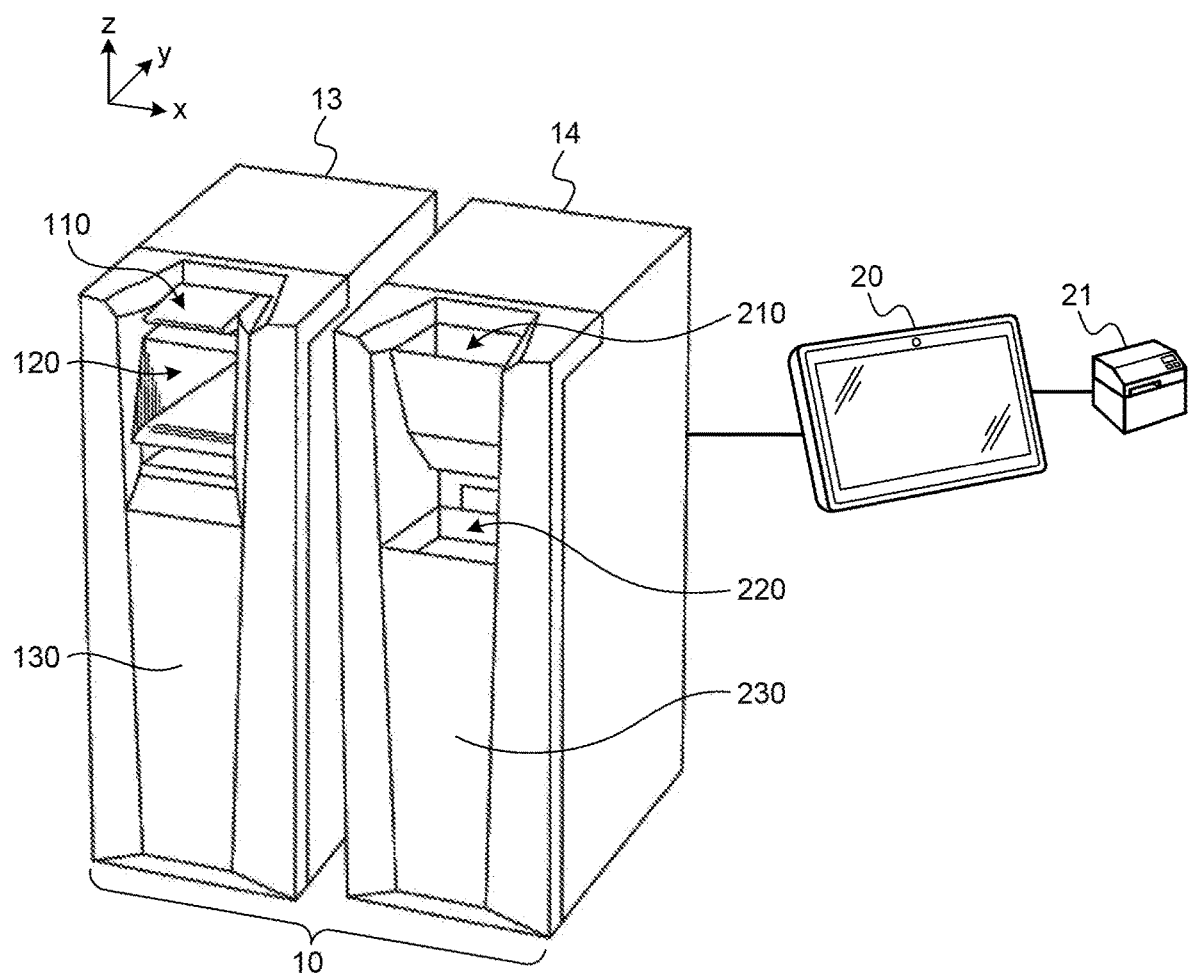
FIG. 2 shows outer appearances of a money handling apparatus and an operation terminal.

FIG. 2 shows the outer appearances of the money handling apparatus 10 and the operation terminal 20. The operation terminal 20 is communicably connected to the money handling apparatus 10 wirelessly or via wires. A printer 21 is communicably connected to the money handling apparatus 10 or the operation terminal 20 wirelessly or via wires. The money handling apparatus 10, the operation terminal 20, and the printer 21 shown in FIG. 2 are installed at a checkout counter in the store 3.

When a customer purchases items in the store 3, a checkout process is performed at the checkout counter. The checkout process includes: a process of calculating a monetary amount of transaction performed between the store 3 and the customer, based on the prices and quantities of items the customer purchases; and a process in which the store 3 receives money corresponding to the monetary amount of transaction from the customer, and issues a receipt on which information regarding the transaction is printed. When the amount of money the store 3 has received from the customer exceeds the monetary amount of transaction, the checkout process further includes a process of returning, from the store 3 to the customer, money as change corresponding to a difference obtained by subtracting the monetary amount of transaction from the amount of the received money. In this case, the information printed on the receipt includes information about the change.

In the checkout process, the money handling apparatus 10, the operation terminal 20, and the printer 21 function as a cash register. Specifically, a store clerk operates the operation terminal 20 to input the prices and quantities of the items, and the money handling apparatus 10 calculates the monetary amount of transaction and controls the printer 21 to issue the receipt.

In the checkout process, the money handling apparatus 10 functions as a change machine. Specifically, the money handling apparatus 10 executes a depositing process of money the customer has paid to store therein money corresponding to the monetary amount of transaction. When the amount of deposited money exceeds the monetary amount of transaction, the money handling apparatus 10 executes a dispensing process to dispense, as change, money corresponding to the difference obtained by subtracting the monetary amount of transaction from the amount of deposited money.

As shown in FIG. 2, the banknote handling unit 13 includes an inlet 110 from which banknotes are deposited, and an outlet 120 from which banknotes are dispensed. The banknote handling unit 13 has a cover 130 at a front surface thereof. With the cover 130 being opened, a cassette 170 (see FIG. 3A) is mounted and dismounted. The coin handling unit 14 includes an inlet 210 from which coins are deposited, and an outlet 220 from which coins are dispensed. The coin handling unit 14 has a cover 230 at a front surface thereof. With the cover 230 being opened, a cassette 270 (see FIG. 3B) is mounted and dismounted.

FIGS. 3A and FIG. 3B schematically show the internal configurations of the banknote handling unit 13 and the coin handling unit 14, respectively. Of the money the customer has paid in the checkout process, banknotes are deposited in the banknote handling unit 13 while coins are deposited in the coin handling unit 14. Of the change to be returned to the customer in the checkout process, banknotes are dispensed from the banknote handling unit 13 while coins are dispensed from the coin handling unit 14.

The banknote handling unit 13 shown in FIG. 3A performs the depositing process and the dispensing process of banknotes. In the dispensing process, banknotes are one by one fed out from storage units 171 (171a to 171c). The fed out banknotes are transported along a transport path by a transport unit 160 and are discharged from the outlet 120. Denominations of banknotes to be stored in the respective storage units 171a to 171c are set in advance. The denominations of banknotes stored in the storage units 171a to 171c and the number and the amount of banknotes for each denomination are managed as inventory information in the memory 12. This allows the money handling apparatus 10 to dispense a required number of banknotes for each required denomination from the outlet 120.

In the depositing process, banknotes received at the inlet 110 are one by one fed out into the apparatus. The fed out banknotes are transported along the transport path by the transport unit 160. A recognition unit 150 recognizes and counts the transported banknotes. The recognition unit 150 recognizes, for example, denomination, authenticity, and fitness of each banknote. Based on the recognition result, banknotes that cannot be deposited are returned as reject notes from the outlet 120, while banknotes that can be deposited are stored in the storage units 171a to 171c for each denomination.

The cassette 170 is mountable and dismountable with respect to the banknote handling unit 13. For example, the cassette 170 is used for collecting banknotes. When collecting banknotes from the money handling apparatus 10, banknotes to be collected are fed out from the storage unit 171 and stored in the cassette 170. The store clerk dismounts the cassette 170, in which the banknotes are stored, from the banknote handling unit 13, and collects the banknotes together with the cassette 170.

The coin handling unit 14 shown in FIG. 3B performs the depositing process and the dispensing of coins. In the dispensing process, coins are one by one fed out from the storage units 271 (271a to 271h). A dispensing transport unit 262 disposed beneath the storage units 271 receives coins fed out from the storage units 271, and transports the coins upward to a feeding unit 280. When the feeding unit 280 opens a bottom portion thereof, the coins in the feeding unit 280 are dropped and discharged into the outlet 220. Denominations of coins to be stored in the storage units 271a to 271h are set in advance. The denominations of coins stored in the storage units 271a to 271h and the number and the amount of coins for each denomination are managed as inventory information in the memory 12. This allows the money handling apparatus 10 to dispense a required number of coins for each required denomination from the outlet 220.

In the depositing process, coins received at the inlet 210 are dropped into the feeding unit 280 inside the apparatus. The coins are one by one fed out from the feeding unit 280. The fed out coins are transported along a transport path by a depositing transport unit 260. A recognition unit 250 recognizes and counts the transported coins. The recognition unit 250 recognizes, for example, denomination, authenticity, and fitness of each coin. The transport path located downstream of the recognition unit 250 is provided with a plurality of chutes 261. Each chute 261 is connected to any one of the outlet 220, a cassette 270, the storage units 271a to 271h, and a collection unit 272. The chutes 261 are usually closed. When a chute 261 is opened based on the recognition result of a coin, the coin is dropped into the chute 261 and stored in any one of the outlet 220, the cassette 270, the storage units 271a to 271h, and the collection unit 272. Coins that cannot be deposited are not dropped from the chutes 261 but are continued to be transported and are returned as reject coins from the outlet 120. Coins that can be deposited are stored in the storage units 271a to 271h for each denomination. The collection unit 272 is used for storing coins that cannot be stored in the storage units 271 because the storage units 271 are full of coins, for example. The feeding unit 280 and the storage units 271 each have a rotary disk that rotates in a inclined state. A plurality of projecting members, which are disposed on an outer area of the upper surface of the rotary disk, catch and feed out coins one by one.

The cassette 270 is mountable and dismountable with respect to the coin handling unit 14. For example, the cassette 270 is used for collecting coins. When collecting coins from the money handling apparatus 10, coins to be collected are fed out from the storage units 271. The dispensing transport unit 262 receives the coins fed out from the storage units 271, transports the coins upwards, and stores the coins in the cassette 270. The store clerk dismounts the cassette 270, in which the coins are stored, from the coin handling unit 14, and collects the coins together with the cassette 270.

Figure 4A:
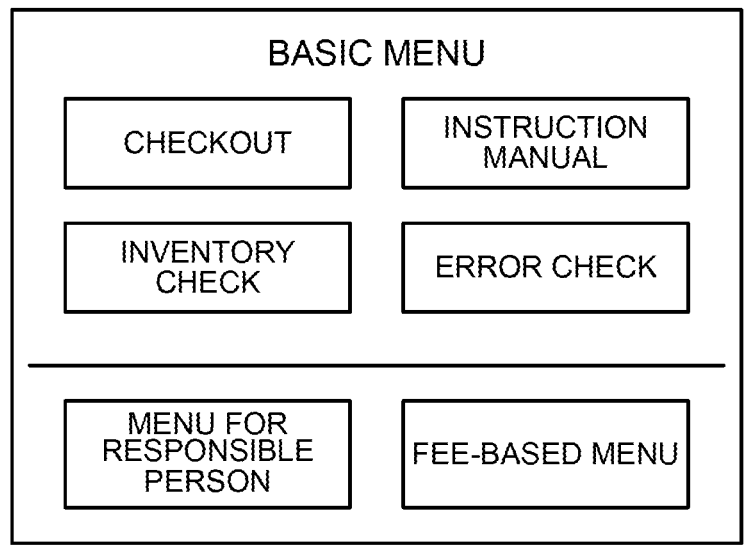
FIG. 4A illustrates basic functions.
Figure 4B:
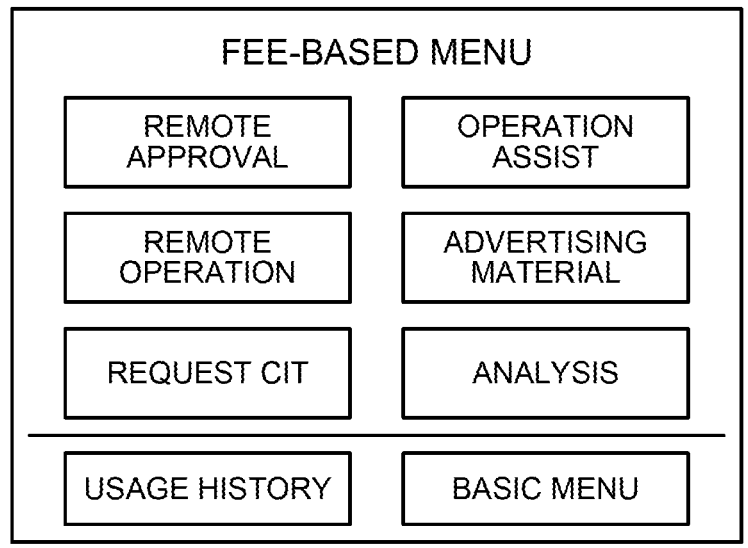
FIG. 4B illustrates extended functions.

Functions of the money handling apparatus 10 include basic functions and extended functions. FIGS. 4A and FIG. 4B illustrate the basic functions and the extended functions, respectively. When the operation terminal 20 is connected to the money handling apparatus 10, a basic menu shown in FIG. 4A is displayed on the screen of the operation terminal 20.

On the screen of the basic menu, a plurality of buttons are displayed as shown in FIG. 4A. Each button corresponds to one of the basic functions of the money handling apparatus 10. The basic functions include checkout, inventory check, display of an instruction manual, error check, and a menu for responsible person. The menu for responsible person will be described later.

The kinds of the basic functions can be changed by setting. For example, functions required for ordinary tasks in the store 3 are set as the basic functions. For example, functions executable even when the money handling apparatus 10 and the operation terminal 20 are not connected to the network 2 are set as the basic functions. That is, functions to be the basic functions are selected so that the ordinary tasks in the store 3 are not impeded even when communication failure has occurred in the network 2.

Figure 5:
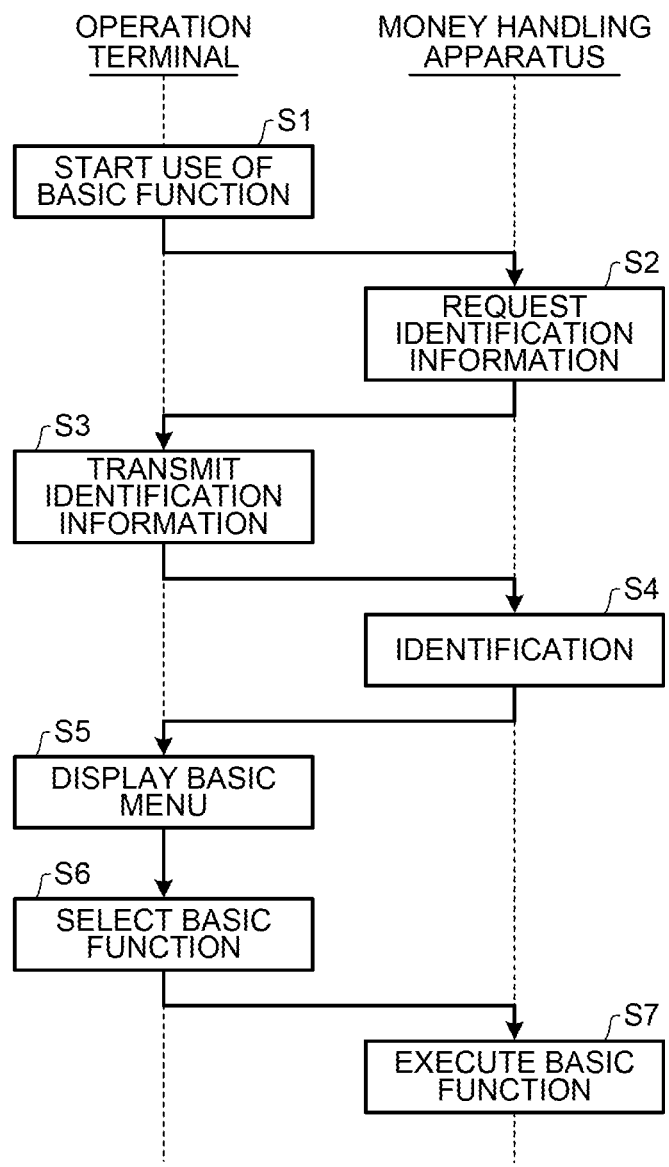
FIG. 5 illustrates the flow of processing using the basic functions.

FIG. 5 shows the flow of processing using the basic functions. The store clerk operates the operation terminal 20 to start the basic functions (step S1). Specifically, the store clerk activates a dedicated application on the operation terminal 20. When the application has been activated, communication is started between the operation terminal 20 and the money handling apparatus 10. The money handling apparatus 10 requests the operation terminal 20 for identification information (step S2). When the operation terminal 20 has transmitted the identification information to the money handling apparatus 10 (step S3), the money handling apparatus 10 executes an identification process (step S4).

For example, the identification process is executed based on whether or not specific information automatically transmitted from the operation terminal 20 to the money handling apparatus 10 matches specific information, of the operation terminal 20, previously registered in the money handling apparatus 10. The specific information is, for example, identification information generated by combining the model number and the serial number of the operation terminal 20. For another example, the identification process is performed based on an ID and a password. In this case, the identification process is executed based on an ID and a password previously registered in the money handling apparatus 10, and an ID and a password inputted to the operation terminal 20.

When the operation terminal 20 has been identified, the money handling apparatus 10 displays the basic menu shown in FIG. 4A on the screen of the operation terminal 20 (step S5 in FIG. 5). When the store clerk operates the operation terminal 20 to select a basic function (step S6), the money handling apparatus 10 executes the selected basic function (step S7).

When the store clerk selects "checkout" from the basic menu shown in FIG. 4A, the money handling apparatus 10 executes a cash-register application prepared for the checkout function, and displays a screen for the checkout process on the operation terminal 20. The cash-register application is a software program that allows the money handling apparatus 10 to function as a cash register. The cash-register application is prepared in the memory 12 in advance.

The screen for the checkout process displayed through execution of the cash-register application corresponds to an operation unit and a display unit of the cash register. The screen includes an operation section including a numeric keypad and a display section displaying the content of transaction. The store clerk can use the operation terminal 20 and the money handling apparatus 10 as a cash register and a change machine connected to the cash register. The store clerk operates the operation terminal 20 to start the checkout process for transaction with the customer.

FIG. 6 shows the flow of the checkout process. The cash-register application allows the money handling apparatus 10 to realize the function of the cash register for processing information of items, information of transaction, and information of money exchanged between the store 3 and the customer in the transaction. Further, using the banknote handling unit 13 and the coin handling unit 14, the money handling apparatus 10 realizes the function of the change machine for handling actual money (cash) exchanged in the transaction. The money handling system 1 has a feature in which the money handling apparatus 10 functions as a cash register. In order to clarify this feature, in FIG. 6, information processing performed by the cash-register application is separated from money handling (cash handling) performed by the banknote handling unit 13 and coin handling unit 14.

When a customer having items to purchase comes to the checkout counter, the store clerk operates the operation terminal 20 to input item information (step S11). For example, the store clerk manually inputs the prices and quantities of the respective items. Based on the inputted information, the money handling apparatus 10 calculates the total amount of prices of the items the customer purchases (step S12). This total amount is a transaction amount that is the monetary amount of item transaction with the customer.

The customer who purchases the items inserts money in the inlets 110 and 210 to pay the transaction amount (step S13). Upon detecting the inserted money, the money handling apparatus 10 executes the depositing process (step S14), and recognizes and counts the money to calculate a deposited amount that is the monetary amount of deposited money. The recognized and counted money is stored in the storage units 171 and 271 of the money handling apparatus 10.

The money handling apparatus 10 calculates a change amount that is the amount of change by subtracting the transaction amount from the deposited amount (step S15). The money handling apparatus 10 displays, on the screen of the operation terminal 20, the prices and quantities of the respective items, the transaction amount, the deposited amount, and the change amount (step S16). The store clerk checks the content of transaction displayed on the screen of the operation terminal 20, and performs an operation to accept the transaction (step S17).

When the transaction has been accepted, the money handling apparatus 10 executes the dispensing process of money corresponding to the change amount (step S18). When the change amount calculated in step S15 is 0 (zero), the change amount is not displayed in step S16, and the change dispensing process in step S18 is not executed.

The money handling apparatus 10 controls the printer 21 to issue a receipt on which the content of transaction is printed, thereby ending the transaction. After the transaction has ended, the money handling apparatus 10 stores the content of transaction in the memory 12 and manages stored content. The content of transaction includes the date and time of transaction, information about purchased items, and information about the depositing process and the dispensing process. These pieces of information are used when extended functions are executed, which will be described later in detail.

When the store clerk selects "inventory check" from the basic menu shown in FIG. 4A, a screen for the inventory check process is displayed on the operation terminal 20. The inventory information managed in the memory 12 of the money handling apparatus 10 is displayed on the screen of the operation terminal 20. Specifically, denominations of banknotes being stored in the banknote handling unit 13 and the number and amount of banknotes for each denomination, and denominations of coins being stored in the coin handling unit 14 and the number and amount of coins for each denomination, are displayed.

When the store clerk selects "instruction manual" from the basic menu, an instruction manual is displayed on the screen of the operation terminal 20. The instruction manual includes, for example, an operation method of the money handling apparatus 10, an operation method of the operation terminal 20, and a maintenance method of the money handling apparatus 10.

When the store clerk selects "error check" from the basic menu, information about an error that has occurred in the money handling apparatus 10 and a method for recovering from the error and resetting the error method are displayed on the screen of the operation terminal 20. The store clerk can perform an error recovery operation while checking the displayed method. The information about the error displayed on the screen includes an error number that is set according to the error type. The error number is used when an extended function is executed, which will be described later in detail.

For example, when a jam of banknotes occurs in the transport path in the banknote handling unit 13, at least one of sensors disposed at various points in the transport path detects the jam as an error. Occurrence of the error is informed to the store clerk by lighting of a lamp disposed on the banknote handling unit 13 or by emitting an error sound. The store clerk, who has recognized the error, selects "error check" from the basic menu on the operation terminal 20. Then, the position where the jam of banknotes has occurred in the transport path and a method for removing the jammed banknotes are displayed on the screen of the operation terminal 20. The store clerk removes the jammed banknotes while checking the information on the screen, thereby recovering the banknote handling unit 13 from the error and resetting the error.

When "menu for responsible person" is selected on the screen shown in FIG. 4A, an identification screen, which prompts inputting of previously registered ID and password of a responsible person of the store 3, is displayed on the screen of the operation terminal 20. When the responsible person has inputted his/her ID and password and has been identified, a list of process contents, which are allowed to be executed only by the responsible person, is displayed on the screen.

The processes displayed on the menu for responsible person are included in the basic functions of the money handling apparatus 10 but cannot be executed by any person other than an operator whose identification information has been registered in advance. The menu for responsible person includes, for example, releasing of a lock mechanism provided in the money handling apparatus 10, and collection of money from the storage units 171 and 271.

The releasing process of the lock mechanism is performed for taking out money stored in the storage units 171 and 271 of the apparatus. The banknote handling unit 13 includes, inside the cover 130, a door having a lock mechanism, so that the banknotes stored in the storage unit 171 cannot be taken out unless the locked door is opened. Likewise, the coin handling unit 14 includes, inside the cover 230, a door having a lock mechanism, so that the coins stored in the storage unit 271 cannot be taken out unless the locked door is opened. The lock mechanisms of the banknote handling unit 13 and the coin handling unit 14 are magnetic lock mechanisms. The responsible person is allowed to select the menu for responsible person and release the locks of the doors of the banknote handling unit 13 and the coin handling unit 14. The responsible person is allowed to open the unlocked doors and take out the money stored in the storage units 171 and 271.

The collection process of money is performed for collecting the money stored in the storage units 171 and 271 of the money handling apparatus 10 by using the cassettes 170 and 270. The responsible person of the store 3 selects the menu for responsible person and executes the money collecting process. When the responsible person designates denominations of money to be collected and the number or amount of money for each denomination, the designated money is fed out from the storage units 171 and 271 and stored in the cassettes 170 and 270. The cassettes 170 and 270 in which money has been stored are taken out from the money handling apparatus 10 through the opened covers 130 and 230, and are collected.

When the store clerk selects "fee-based menu" on the screen shown in FIG. 4A, the money handling apparatus 10 starts processing to use the extended functions provided by the function providing server 30. FIG. 7 shows the flow of the processing to use the extended functions.

The kinds of the extended functions provided in the fee-based menu can be changed by setting. Functions that are not included in the basic functions but are likely to be needed in the store 3 are set as the extended functions.

When the store clerk operates the operation terminal 20 to select "fee-based menu" (step S21), the money handling apparatus 10 starts communication with the function providing server 30 for the purpose of using the extended functions (step S22). The function providing server 30 requests the money handling apparatus 10 for identification information (step S23). When the money handling apparatus 10 has transmitted the identification information to the function providing server 30 (step S24), the function providing server 30 executes an identification process (step S25).

For example, the identification process is executed based on whether or not specific information automatically transmitted from the money handling apparatus 10 to the function providing server 30 matches specific information, of the money handling apparatus 10, previously registered in the function providing server 30. The specific information is identification information generated by combining the model number and the serial number of the money handling apparatus 10, for example. For another example, the identification process is performed based on an ID and a password. In this case, the identification process is executed based on an ID and a password previously registered in the function providing server 30 and an ID and a password inputted to the operation terminal 20.

When the function providing server 30 identifies the money handling apparatus 10, the money handling apparatus 10 is allowed to start use of the extended functions provided by the function providing server 30 (step S26). The money handling apparatus 10 displays the fee-based menu shown in FIG. 4B on the screen of the operation terminal 20 (step S27). When the store clerk operates the operation terminal 20 to select an extended function from the fee-based menu (step S28), the money handling apparatus 10 and the function providing server 30 execute the selected extended function (step S29).

On the screen of the fee-based menu, a plurality of buttons are displayed as shown in FIG. 4B. Each button corresponds to one of the extended functions provided by the function providing server 30. The extended functions include remote approval, remote operation, request for cash-in-transit (CIT) service, operation assist, provision of advertising materials, and analysis. A management company managing the function providing server 30 charges the store 3 that has used an extended function, according to the usage content of the extended function, and therefore there is an indication of "fee-based menu" on the screen.

Although not shown in FIG. 4B, the charge for each extended function may be displayed together with the title thereof. Further, the total amount of charges for extended functions that the store 3 has used within a predetermined period may be displayed on the screen.

The management company sets the charge for each extended function. The charge for each extended function may be set based on the number of times or on the time period. For example, the management company may set the charge for each extended function based on the number of times such as "per use", or on the time period such as "per day" or "per month".

A part or whole of each extended function is provided by the function providing server 30. Therefore, the extended functions cannot be used unless the money handling apparatus 10 is connected to the function providing server 30 via the network 2. When the money handling apparatus 10 and the function providing server 30 connected to each other via the network 2 cooperate to execute an extended function, the function providing server 30 charges the store 3 according to the usage state of the extended function. The function providing server 30 manages, in the memory 32, the usage history of the extended functions used in the store 3 and amounts of the charges for the use of the extended functions.

When the store clerk selects "remote approval" from the fee-based menu shown in FIG. 4B, a list of the kinds of processes that cannot be executed without an approval of the responsible person of the store 3 is displayed on the screen of the operation terminal 20. The kinds of processes that need remote approval are set by the store 3 or the management company.

When the store clerk operates the operation terminal 20 to select a displayed process he/she desires to execute, the function providing server 30 notifies the mobile device 40 held by the responsible person of the selected process. Then, on the screen of the mobile device 40, the responsible person checks the kind of the process for which the store clerk has requested remote approval, and performs an operation to approve execution of the process. When the operation for approval has been executed by the mobile device 40, the function providing server 30 transmits, to the money handling apparatus 10 in the store 3, a signal that instructs permission of execution of the approved process. This allows the store clerk to execute, with the money handling apparatus 10, the process approved by the responsible person through the operation of the mobile device 40.

For example, a jam of banknotes may occur while banknotes are being fed out from the storage unit 171 to the transport path in the banknote handling unit 13. Such a jam of banknotes results in an error, and the operation of the banknote handling unit 13 is stopped. In order to recover from the error and resume the handling of banknotes, it is necessary to release the lock of the door inside the cover 130, open the door, and remove banknotes jammed near a feeding port of the storage unit 171. The store clerk uses the function of remote approval because he/she does not have the authority to release the lock of the door.

FIG. 8 shows the flow of a process for releasing the lock mechanism of the money handling apparatus 10 by using the function of remote approval. The store clerk operates the operation terminal 20 to select "remote approval" from the fee-based menu, and requests the responsible person of the store 3 for an approval for the process of releasing the lock of the door (step S31). Upon recognizing this request, the function providing server 30 transmits an approval request notification to the mobile device 40 of the responsible person (step S32).

The responsible person checks the content of the request on the mobile device 40, and performs an approval operation (step S33). Upon recognizing the approval operation has been performed by the responsible person, the function providing server 30 controls the money handling apparatus 10 so that the store clerk can execute the lock releasing process (step S34). Thus, the money handling apparatus 10 permits the store clerk to execute the lock releasing process (step S35). When the store clerk operates the operation terminal 20 to execute the lock releasing process (step S36), the money handling apparatus 10 releases the lock of the door (step S37).

When the responsible person has remotely approved of releasing the lock of the door by the store clerk, the function providing server 30 adds a lock releasing button to the basic menu displayed on the operation terminal 20, for example. Then, the store clerk operates the operation terminal 20 to select the lock releasing button from the basic menu, and releases the lock of the door inside the banknote handling unit 13. Thus, the store clerk can remove banknotes jammed near the storage unit 171 to recover the banknote handling unit 13 from the error. The lock releasing button is removed from the basic menu when a predetermined time has passed from the approval operation performed by the responsible person.

The method for executing a process that has been approved by the responsible person through operation of the mobile device 40 is not limited to the method in which the money handling apparatus 10 executes the process in response to the operation to the operation terminal 20 by the store clerk. For example, the function providing server 30 controls the money handling apparatus 10 to release the lock of the door inside the banknote handling unit 13. Other processes based on remote approval are performed in a similar manner to the lock releasing process shown in FIG. 8.

When the store clerk selects "remote operation" from the fee-based menu shown in FIG. 4B, a list of the kinds of processes that are executable by remote operation is displayed on the screen of the operation terminal 20. For example, a list of the kinds of processes that are executable only by the responsible person of the store 3 is displayed. The kinds of processes to be subjected to the remote operation are set by the store 3 or the management company. For example, processes to be executed by the responsible person through the remote operation are set separately from the processes to be executed by the store clerk upon receiving remote approval from the responsible person.

When the store clerk operates the operation terminal 20 to select a process, the function providing server 30 notifies the mobile device 40 held by the responsible person of the selected process. The responsible person checks the kind of the process for which the store clerk has requested remote operation, on the screen of the mobile device 40. By using the mobile device 40, the responsible person remotely operates the money handling apparatus 10 via the function providing server 30 to execute the process requested by the store clerk.

When the store clerk selects "remote approval" from the fee-based menu, the store clerk executes a process for which the approval of the responsible person has been obtained. Meanwhile, when the store clerk selects "remote operation", a process desired by the store clerk is executed by the responsible person through the remote operation. For example, when "remote operation" is selected to release the lock of the door of the money handling apparatus 10, the responsible person releases the lock of the door by operating the mobile device 40. In this case, the function providing server 30 controls the money handling apparatus 10 to release the lock, based on the operation performed on the mobile device 40.

The remote operation is not limited to be executed in response to a request from the store clerk. The responsible person voluntarily executes the remote operation. When the responsible person operates the mobile device 40 to connect the mobile device 40 to the function providing server 30, the fee-based menu shown in FIG. 4B is displayed on the screen of the mobile device 40. By operating the mobile device 40 to select "remote operation", the responsible person can remotely operate the money handling apparatus 10 while being present in a place away from the store 3.

FIG. 9 shows the flow of processing using the extended functions through operation of the mobile device 40. FIG. 9 shows an example in which the money collecting process is executed by the money handling apparatus 10 through the remote operation. The responsible person of the store 3 operates the mobile device 40 to start the extended functions (step S41). Specifically, when the responsible person activates a dedicated application in the mobile device 40, communication is started between the mobile device 40 and the function providing server 30. The function providing server 30 requests the mobile device 40 for identification information (step S42). When the mobile device 40 has transmitted the identification information to the function providing server 30 (step S43), the function providing server 30 executes an identification process (step S44).

For example, the identification process is executed based on whether or not specific information automatically transmitted from the mobile device 40 to the function providing server 30 matches specific information, of the mobile device 40, previously registered in the function providing server 30. The specific information is, for example, identification information generated by combining the model number and the serial number of the mobile device 40. Alternatively, the specific information is an international mobile equipment identity (IMEI) of the mobile device 40. For another example, the identification process is performed based on an ID and a password. In this case, the identification process is executed based on an ID and a password previously registered in the function providing server 30, and an ID and a password inputted to the mobile device 40.

The function providing server 30 having identified the mobile device 40 displays the fee-based menu shown in FIG. 4B on the screen of the mobile device 40 (step S45). The responsible person operates the mobile device 40 to select "remote operation" from the fee-based menu. Subsequently, when the responsible person selects the money collection process from the list of remotely operable processes displayed on the screen of the mobile device 40, the function providing server 30 obtains inventory information managed in the memory 12 by the money handling apparatus 10 and displays the obtained inventory information on the screen of the mobile device 40. The responsible person checks the inventory information displayed on the screen of the mobile device 40. The responsible person designates the denominations of money to be collected and the number or amount of money for each denomination and instructs execution of the money collecting process (step S46). Upon receiving the instruction, the function providing server 30 controls the money handling apparatus 10 (step S47), whereby the money collecting process is executed by the money handling apparatus 10 (step S48). Based on the denominations of money, and the number or amount of money for each denomination, which are designated by the mobile device 40, the money handling apparatus 10 feeds out money from the storage units 171 and 271 into the cassettes 170 and 270. When all the money designated by the responsible person has been stored in the cassettes 170 and 270, the money handling apparatus 10 ends the money collecting process.

The responsible person can use other extended functions included in the fee-based menu by operating the mobile device 40. Since the usage method of the extended functions is the same regardless of whether the operation terminal 20 is operated to select the extended functions or the mobile device 40 is operated to select the extended functions, other extended functions will be described below for the case where the store clerk operates the operation terminal 20.

When the store clerk selects "request CIT" from the fee-based menu shown in FIG. 4B, a list of CIT companies available in response to the request of the store 3 is displayed on the screen of the operation terminal 20. The store clerk operates the operation terminal 20 to select a CIT company and requests the selected CIT company for transportation of money.

For example, when the storage units 171 and 271 of the money handling apparatus 10 are almost filled with money, the store clerk requests the CIT company to collect money from the store 3. Meanwhile, when money in the storage units 171 and 271 of the money handling apparatus 10 is likely to be insufficient for dispensing of change, the store clerk requests the CIT company to deliver money to the store 3. The store clerk operates the operation terminal 20 to designate denominations of money and the number or amount of money for each denomination, thereby requesting for transportation of money.

When the store clerk operates the operation terminal 20 to request the CIT company for transportation of money, the function providing server 30 notifies the CIT company of the request for transportation. The function providing server 30 notifies the CIT company of the content of the request and information about the store 3. Notification is performed by, for example, a dedicated application using E-mail or the network 2. For example, the CIT company uses a computer terminal to receive the notification and checks the content of the request of the store 3 through the computer terminal. Upon receiving the notification, the CIT company checks the place of the store 3 and the content of the request, and performs collection of money from the store 3 or delivery of money to the store 3. When the request of the store 3 is delivery of money, the content of the request includes denominations of money and the number or amount of money for each denomination designated by the store clerk. Based on the content of the request notified from the function providing server 30, the CIT company delivers the money designated by the store clerk to the store 3.

When the store clerk selects "operation assist" from the fee-based menu, a list of the kinds of processes that can be assisted is displayed on the screen of the operation terminal 20. When the store clerk operates the operation terminal 20 to select a process, the function providing server 30 displays, on the screen of the operation terminal 20, information that introduces the content of operation to be performed by the store clerk with regard to the selected process. The content of operation is introduced by use of still images and/or moving images.

For example, when an error has occurred in the money handling apparatus 10 and the store clerk cannot recover the apparatus from the error and reset the error even by using "instruction manual" and "error check" in the basic menu, the store clerk uses "operation assist" in the fee-based menu. The store clerk, who has executed "operation assist", operates the operation terminal 20 to input information about the error into the function providing server 30. For example, the store clerk inputs an error number. The store clerk can check the error number by executing "error check" in the basic menu. The function providing server 30 recognizes the content of the error, based on the inputted information. In the memory 32, information to be used for explaining an error recovering method is prepared in association with each error number. Upon recognizing the error number, the function providing server 30 refers to the information prepared in the memory 32 based on the error number and introduces the error recovering method for the store clerk through the operation terminal 20. For example, the function providing server 30 guides the store clerk to perform specific step-by-step operations required for error recovery, by using still images and/or moving images.

When executing the operation assist function, a voice recognition technique may be used. For example, after selecting the operation assist for error recovery, the store clerk utters the error number toward a microphone provided in the operation terminal 20. This voice is transmitted from the store 3 to the function providing server 30. The function providing server 30 recognizes the error number by using the voice recognition technique, and guides the store clerk to perform the corresponding error recovering method.

When executing the operation assist process, a call button for calling a staff member in charge is displayed on the screen of the operation terminal 20. For example, a staff member in charge of the operation assist function is on standby in the management company where the function providing server 30 is installed. The store clerk can receive support from the staff member in charge by pressing the call button on the operation terminal 20. When the store clerk presses the call button, the store clerk is allowed to converse with the staff member in charge through a microphone and a speaker provided in the operation terminal 20 and a microphone and a speaker provided in the function providing server 30. The store clerk explains the situation to the staff member in charge and receives an explanation about the operation method.

When the store clerk selects "advertising material" from the fee-based menu, a list of purchasable advertising materials is displayed on the screen of the operation terminal 20. The advertising materials are still images and moving images to be displayed on the screen of the operation terminal 20 for the purpose of advertisement. When the store clerk operates the operation terminal 20 to select an advertising material of the list, the advertising material is downloaded from the function providing server 30 and stored in the memory 12 of the money handling apparatus 10. The advertising materials stored in the memory 12 is displayed on the screen of the operation terminal 20.

For example, when the store 3 has a sale, the store clerk purchases moving images prepared for a sale. The store clerk operates the operation terminal 20 to input the date and time of the sale and information of items to be sold on the sale. In the time during which the store clerk does not use the operation terminal 20, moving images including the date and time of the sale and the information of items to be sold on the sale, which have been inputted by the store clerk, are reproduced on the screen of the operation terminal 20.

In addition to the operation terminal 20 for using the basic functions and the extended functions, an operation terminal 20 for advertisement may be connected to the money handling apparatus 10. For example, when the operation terminal 20 for advertisement is installed at the checkout counter, still images and moving images for advertisement can be reproduced for the customer at the checkout counter and other customers in the store 3 even while the store clerk is using the operation terminal 20.

When the store clerk selects "analysis" from the fee-based menu, a list of the kinds of available analysis is displayed on the screen of the operation terminal 20. The analysis is a function for obtaining information useful for the store 3 by using information about the contents of past transactions stored in the memory 12 of the money handling apparatus 10.

The kinds of analysis include, for example, analysis for proceeds from sales and analysis for money prepared for change. When the store clerk operates the operation terminal 20 to select the analysis for proceeds from sales, the contents of past transactions stored and managed in the memory 12 of the money handling apparatus 10 are transmitted to the function providing server 30. The contents of transactions include the kinds, prices, and quantities of items sold in the store 3, and the dates and times of the sales. For example, the function providing server 30 performs analysis on the frequency of laying each item in a stock of the store 3 and on the quantity of each item to be stocked in the store 3, based on the kinds and quantities of items sold in the store 3 in the past. The function providing server 30 displays the analysis result on the operation terminal 20. For another example, the function providing server 30 performs analysis on the relationship between the past temperatures/weather patterns and the sales performance of each item. Based on the weather reports for the next day onwards, the function providing server 30 displays, on the operation terminal 20, items whose sales are expected to increase.

When the store clerk operates the operation terminal 20 to select "analysis for money prepared for change", the contents of past transactions stored and managed in the memory 12 of the money handling apparatus 10 are transmitted to the function providing server 30. The contents of transactions include denominations and number of money deposited in the money handling apparatus 10, and denominations and number of money dispensed from the money handling apparatus 10. Based on the denominations and the number of the deposited and dispensed money, the function providing server 30 analyzes how much and how frequently the store 3 has to prepare money for each denomination, as change, and displays the analysis result on the operation terminal 20.

When the store clerk selects "basic menu" on the screen of the fee-based menu shown in FIG. 4B, the basic menu shown in FIG. 4A is displayed on the screen of the operation terminal 20. When the store clerk selects "usage history" on the screen showing the fee-based menu, the usage history of the fee-based menu is displayed on the screen of the operation terminal 20. The store clerk can check, on the screen showing the usage history, the dates and times when the fee-based menu has been used in the past, the usage contents, and the charges for the used extended functions. On the usage history screen, the store clerk can check the next billing date and amount for the used extended functions.

In the above embodiment, the store clerk of the store 3 mainly uses the fee-based menu. However, the responsible person of the store 3 can also use the functions on the fee-based menu to perform various processes. For example, the responsible person executes "inventory check" on the fee-based menu to check inventory information of the money handling apparatus 10. When collection of money is needed, the responsible person executes "request CIT" on the fee-based menu to request a CIT company for collection of money from the store 3 while he/she is outside the store 3. The responsible person, who has requested for the collection of money, can execute the money collecting process through the remote operation as described above to store the money to be collected, into the cassettes 170 and 270. The CIT company can collect the cassettes 170 and 270 in which the money has been stored.

The respective functions described as the basic functions in the present embodiment are merely examples, and the basic functions are not limited thereto. Likewise, the respective functions described as the extended functions in the present embodiment are merely examples, and the extended functions are not limited thereto. For example, the functions described as the basic functions may be included in the extended functions, and the functions described as the extended functions may be included in the basic functions.

Functions provided by the function providing server 30, i.e., functions that cannot be executed unless the circumstances allow use of the function providing server 30, are the extended functions, and functions other than the extended functions are the basic functions. The basic functions are not limited to those executable while the money handling apparatus 10 and the operation terminal 20 are not connected to the network 2. For example, the basic functions may include processes to be performed by the money handling apparatus 10 and the operation terminal 20 by using information obtained through the network 2. Not all the extended functions provided by the function providing server 30 are charged. Freely available extended functions may be included. As to which functions are basic functions and which ones are extended functions and which extended functions are charged and which ones are free are variable depending on settings.

The configuration of the money handling system 1 according to the present embodiment shown in FIG. 1 is conceptually functional, and therefore, the money handling system 1 is not physically limited to the configuration. For example, the money handling apparatus 10 and the operation terminal 20 shown in FIG. 1 may be integrated in a single apparatus. The banknote handling unit 13 and the coin handling unit 14 shown in FIG. 2 may be integrated in a single apparatus. Alternatively, for example, the function providing server 30 may be divided into a plurality of devices, and the respective devices may implement the function and operation of the function providing server 30 in cooperation with each other. The manners of division and integration of the respective devices are not limited to the above examples, and the entirety or part of the devices may be functionally or physically divided or integrated in any unit, according to various loads and/or usage states.

The money handling system 1 includes: the money handling apparatus 10 installed in a store 3 and capable of executing basic functions including a checkout function; and the operation terminal 20 for operating the money handling apparatus. When executing the checkout function, the money handling apparatus 10 receives, through the operation terminal 20, an input of prices and quantities of items a customer purchases in the store 3, to calculate a monetary amount of transaction amount. The money handling apparatus 10 recognizes and counts money, which has been deposited through the inlet 110 and 210 for payment for the transaction amount, to calculate an amount of deposited money, and stores the deposited money in the money handling apparatus. When the amount of deposited money exceeds the transaction amount, the money handling apparatus 10 feeds out money corresponding to a difference therebetween from the money handling apparatus, and dispenses the money as change to the outlet 120 and 220.

In the money handling system 1, the basic functions are executable when the money handling apparatus 10 and the operation terminal 20 are isolated from the network 2.

The money handling system 1 further includes the function providing server 30 configured to provide extended functions different from the basic functions. The extended functions become executable in the money handling apparatus 10 when the money handling apparatus is connected to the function providing server 30 via the network 2.

In the money handling system 1, the extended functions include the remote operation function by which the function providing server 30 controls the money handling apparatus 10 via the network 2.

In the money handling system 1, the extended functions include the remote approval function by which the function providing server 30 receives an approval for a process executable, only by a predetermined operator, in the money handling apparatus 10, and controls the money handling apparatus 10 so that a person other than the predetermined operator can execute the process.

As described above, the basic functions executable by the money handling apparatus 10 include the function of checkout and the function of inventory check which are used for daily tasks by the store clerk. When the functions of the money handling apparatus 10 are limited to the basic functions, the cost for introducing the money handling apparatus 10 in the store 3 is reduced, which facilitates introduction of the money handling apparatus 10 to the store 3.

The store clerk can use, for example, a tablet computer as the operation terminal 20. The store clerk can use the money handling apparatus 10 and the operation terminal 20 as a cash register and a change machine. Thus, even a store 3 having no POS system can easily introduce and utilize the money handling apparatus 10.

As described above, the money handling apparatus and the money handling system according to the present invention can be easily introduced in any store regardless of the scale of the store.

What is claimed is:

1. A money handling system comprising:
   a money handling apparatus configured to be installed in a store and configured to execute basic functions including a checkout function;
   an operation terminal connected to the money handling apparatus; and
   a function providing server configured to provide extended functions different from the basic functions, wherein:
   when executing the checkout function, the money handling apparatus is configured to receive an input of prices and quantities of items a customer purchases in the store through the operation terminal to calculate a transaction amount, recognize and count money deposited through an inlet for paying the transaction amount to calculate a deposit amount of deposited money, store the deposited money inside the money handling apparatus, and dispense, to an outlet from inside the money handling apparatus, money corresponding to a difference between the deposit amount and the transaction amount as change in a case where the deposit amount exceeds the transaction amount,
   the extended functions are executable by the money handling apparatus only when the money handling apparatus is connected to the function providing server via a network, and when executing the extended functions, a menu showing the extended functions is displayed on the operation terminal such that a store clerk operates the operation terminal to select an extended function from the menu, and
   the extended functions are executable by the money handling apparatus only upon payment of a fee according to content of used extended functions.

2. The money handling system according to claim 1, wherein the basic functions are executable in the money handling apparatus when the money handling apparatus and the operation terminal are isolated from the network.

3. The money handling system according to claim 1, wherein the extended functions include a remote operation function by which the function providing server controls the money handling apparatus via the network.

4. The money handling system according to claim 1, wherein the extended functions include a remote approval function by which the function providing server receives an approval for a process, wherein the remote approval function is executable only by a predetermined operator and controls the money handling apparatus so that a person other than the predetermined operator can execute the process in the money handling apparatus.

5. The money handling system according to claim 1, wherein the function providing server is configured to manage a usage history of the extended functions used in the store and amounts of fees for the extended functions charged to the store.

6. A money handling method comprising:
   when executing basic functions including a checkout function using a money handling apparatus installed in a store:
   receiving, at an operation terminal connected to the money handling apparatus, an input of prices and quantities of items purchased by a customer in the store to calculate a transaction amount;
   recognizing and counting money that is deposited to the money handling apparatus for paying the transaction amount, to calculate a deposit amount of deposited money;
   storing the deposited money inside the money handling apparatus; and
   dispensing, from the money handling apparatus, money corresponding to a difference between the deposit amount and the transaction amount as change in a case where the deposit amount exceeds the transaction amount; and when executing extended functions that are provided by a function providing server and different from the basic functions:
    displaying a menu showing the extended functions on the operation terminal such that a store clerk operates the operation terminal to select an extended function from the menu, wherein:
        the extended functions are executable by the money handling apparatus only when the money handling apparatus is connected to the function providing server via a network, and
        the extended functions are executable by the money handling apparatus only upon payment of a fee according to content of used extended functions.

7. A money handling system comprising:

a money handling apparatus configured to be installed in a store and configured to execute basic functions including a checkout function;

an operation terminal connected to the money handling apparatus; and a function providing server configured to provide extended functions different from the basic functions, wherein:

when executing the checkout function, the money handling apparatus is configured to receive an input of prices and quantities of items a customer purchases in the store through the operation terminal to calculate a transaction amount, recognize and count money deposited through an inlet for paying the transaction amount to calculate a deposit amount of deposited money, store the deposited money inside the money handling apparatus, and dispense, to an outlet from inside the money handling apparatus, money corresponding to a difference between the deposit amount and the transaction amount as change in a case where the deposit amount exceeds the transaction amount, the extended functions are executable by the money handling apparatus only when the money handling apparatus is connected to the function providing server via a network, and when executing the extended functions, a menu showing the extended functions is displayed on the operation terminal such that a store clerk operates the operation terminal to select an extended function from the menu, and the function providing server is configured to manage a usage history of the extended functions used in the store and amounts of fees for the extended functions charged to the store.

8. A money handling method comprising:

when executing basic functions including a checkout function using a money handling apparatus installed in a store:
    receiving, at an operation terminal connected to the money handling apparatus, an input of prices and quantities of items purchased by a customer in the store to calculate a transaction amount;
    recognizing and counting money that is deposited to the money handling apparatus for paying the transaction amount, to calculate a deposit amount of deposited money;
    storing the deposited money inside the money handling apparatus; and
    dispensing, from the money handling apparatus, money corresponding to a difference between the deposit amount and the transaction amount as change in a case where the deposit amount exceeds the transaction amount; and when executing extended functions that are provided by a function providing server and different from the basic functions:
    displaying a menu showing the extended functions on the operation terminal such that a store clerk operates the operation terminal to select an extended function from the menu, wherein:
        the extended functions are executable by the money handling apparatus only when the money handling apparatus is connected to the function providing server via a network, and
        the function providing server manages a usage history of the extended functions used in the store and amounts of fees for the extended functions charged to the store.

9. A function providing server comprising:

a memory configured to store information required for implementing functions and operations of the function providing server; wherein:

the function providing server is connected to a money handling apparatus configured to execute basic functions, and the function providing server is configured to provide the money handling apparatus with extended functions different from the basic functions, and the extended functions are executable by the money handling apparatus only upon payment of a fee according content of used extended functions.

10. A function providing server comprising:

a memory configured to store information required for implementing functions and operations of the function providing server; wherein:

the function providing server is connected to a money handling apparatus configured to execute basic functions, and the function providing server is configured to provide the money handling apparatus with extended functions different from the basic functions, and manage a usage history of the extended functions executed by the money handling apparatus and amounts of fees for the executed extended functions.

\* \* \* \* \*